Sept. 20, 1955 P. E. YOUNG 2,718,139
GRAVITOMETER
Filed Jan. 9, 1953
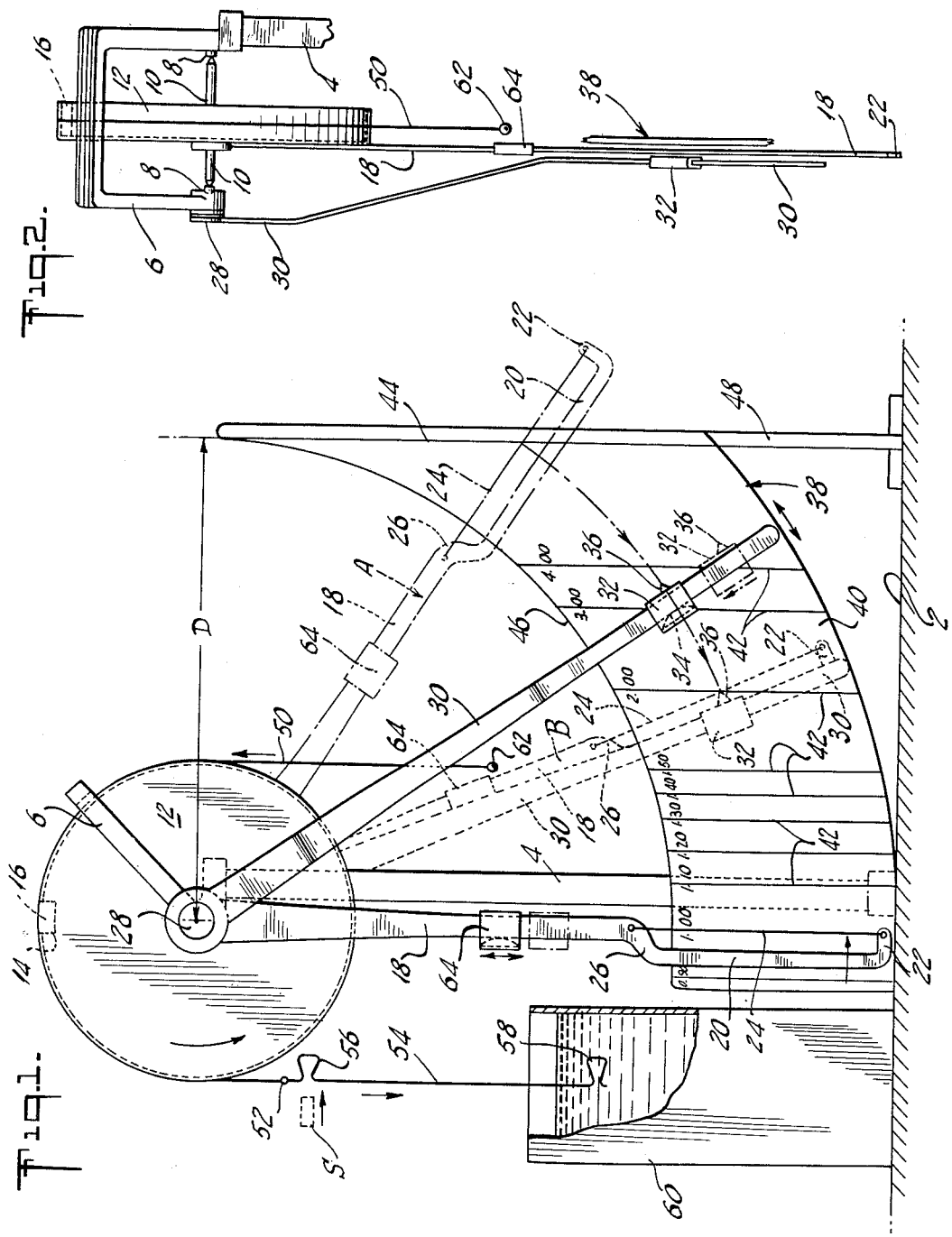
INVENTOR.
PHILIP E. YOUNG
BY
Eyre, Mann & Burrows
ATTORNEYS

United States Patent Office 2,718,139
Patented Sept. 20, 1955

2,718,139

GRAVITOMETER

Philip E. Young, Fairhaven, Mass.

Application January 9, 1953, Serial No. 330,432

9 Claims. (Cl. 73—32)

The present invention relates to the measurement of specific gravity and comprises a novel gravitometer that is direct reading, highly accurate and simple to use and to construct.

In many industries, as for example in the rubber industry, specific gravity measurements must be made regularly to insure uniformity of product. With the present device a relatively unskilled operator can measure the specific gravity of a sample in a minute or less and with assurance of accuracy. This is much faster than measurements can be made on any instrument now in existence.

The new gravitometer is based upon the well-known relation between specific gravity and the ratio of the weight of a body in air to the difference in the weights of the same body in air and in water. A pivotally mounted and counter-weighted drum assumes different angular positions when the sample to be tested is in air and when it is in water, the drum moving under opposing forces due to the weight of the sample and to the weights of the drum and of a radially disposed arm rigidly secured to the drum. By means of a manually movable index arm pivoted to swing about the axis of the drum, and of a vertical reference line spaced laterally from the drum and defining a starting position for a movable index on the index arm and corresponding to the angular position of the drum when the sample is in air, the specific gravity of the sample can be read directly from a fixed scale by noting, with the aid of the index, the angular position of the drum carried arm when the body is in water. Thus, the only reading to be taken is that of the final position of the drum carried arm and that reading, assuming the scale so calibrated, is the specific gravity of the sample.

For a better understanding of the invention, reference may be had to the accompanying drawing, of which—

Fig. 1 is a diagrammatic front elevation of a gravitometer embodying the invention; and Fig. 2 is a side view partly broken away, of the device of Fig. 1.

The device diagrammatically illustrated in the drawings is particularly designed for use in the measurement of the specific gravity of relatively small samples, but the principle of the device is applicable to a wide range of materials and weights. For use in measuring the specific gravity of small samples of rubber, a device having an overall height of about 25 inches and width of 16 inches is satisfactory. In the drawings the reference numeral 2 indicates a suitable support, as for example a table, upon which the gravitometer may be mounted. Fixed to the support 2 is an upright member 4, to the upper end of which is secured a U-shaped bracket 6 carrying bearings 8 for a horizontally disposed shaft 10, the bracket 6 in the particular embodiment of the invention illustrated in the drawing being disposed at an angle to the vertical. Fixed to the shaft 10 is a drum 12 which is provided with a peripheral pocket 14 for reception of a counter-weight 16, the weight being secured in the pocket 14 by any suitable means. Oppositely disposed with respect to the weight 16 is an arm 18 which is rigidly secured to a face of the drum and extends radially therefrom along the extended diametral line passing through the axis of the drum and the weight 16. The free end of arm 18 is offset as indicated at 20 and the extreme end of the arm is turned through a right angle at 22. A filament 24, for example a fine wire, thread or hair, is secured between the end 22 of the arm 18 and the bend 26 of the arm occurring at the start of the offset portion 20, the filament being disposed radially with respect to the axis of rotation of the drum. The front arm of bracket 6 carries a stud 28 axially alined with the shaft 10 and on this stud is frictionally mounted one end of an index arm 30 for movement by the operator during the measuring operations.

Index arm 30 for a portion of its length intermediate its ends is inclined rearwardly, as shown best in Fig. 2, to bring the free end of the index arm for a length about equal to the length of filament 24 into a vertical plane parallel to, and but slightly in front of, the plane of movement of the free end of arm 18. An index 32 is adjustably mounted on the free end of the index arm 30. The index comprises a sleeve frictionally held on the arm 30 by a leaf spring 34 and carrying a pointed projection 36.

Slightly in the rear of the plane of movement of arm 18 is a vertical wall member 38, the front surface of which lies in a plane perpendicular to the vertical plane containing the axis of the drum and serves as a scale 40 for yielding specific gravity readings. The scale comprises indicia representing specific gravity values and vertical lines 42 associated therewith. The spacing of the vertical lines and the numerical values associated therewith are determined with reference to the horizontal distance D from the vertical plane containing the axis of the drum of a "starting line" 44 on the scale, as will be explained hereinafter. The wall member 38 is preferably generally arcuate in shape with the center of curvature of the upper edge 46 thereof lying on the axis of the drum and the radius of curvature thereof equal to the distance D. The wall member 38 in the particular embodiment of the invention illustrated in the drawing is supported by an upright member 48 spaced laterally and forwardly of the upright 4.

A flexible tape or band 50 is secured to the drum at a point in the neighborhood of the counterweight 16. One end of the band 50 is secured, as by a bead or clip 52, to a wire 54 having two spring clip sections 56 and 58 each adapted to grasp and support a sample the specific gravity of which is to be measured. A receptacle 60 adapted to contain water is positioned on the base 2 and the part of the wire including clip 58 extends into the receptacle to a depth sufficient for the clip to be immersed in water when the apparatus is in use. To compensate for the buoyancy of the immersed part of the wire, the tape or band 50 is so selected that its weight per inch is equal to half the displacement weight per inch of the wire. The other end of the band carries a small counter-weight 62. Spring mounted on the arm 18 is a sleeve 64, serving as an adjustable weight.

The counter-weight 62 is such that when water is added to the receptacle 60 up to the level indicated in the drawing and no sample is carried by the wire, the arm 18 will be vertical with the filament 24 thereof alined with the indication 1.00 on the scale 40. Before the band 50, counter-weight 62 and wire 54 are added to the drum, the drum with its counter-weight 16 and arm 18 should be so balanced that the arm 18 is vertical and the filament 24 overlies the scale line 1.00. The counter-weight 16 should be such that with the weight 64 at its uppermost position on arm 18 the lightest sample to be measured when in the clip 56 swings the arm 18 to a position where the filament 24 crosses the line 44. With these preliminary adjustments made, measurement of specific gravity with the above described device is effected as follows.

The sample to be measured, as for example the sample indicated at S in Figure 1, is placed in the clip 56. Arm 18 thereupon rotates to a position such as that indicated at A in dotted lines in Fig. 1. Index arm 30 is then manually rotated counter clockwise to bring it over the arm 18. Index 32 is manually adjusted along the index arm 30 until the tip of the projection 36 is alined with the intersection of the filament 24 with the line 44 of the scale. The sample is then removed from the clip 56 and placed in the clip 58. The pointer arm 18 thereupon rotates back toward the vertical position and comes to rest at some intermediate point along the scale, as for example, the dotted line position indicated at B. Index arm 30 is then manually moved clockwise to bring the tip of the projection 36 over the filament 24. The numerical value associated with the vertical line on the scale underlying the intersection of the tip of the projection 36 with the filament 24 is the specific gravity of the sample.

Thus measurement of specific gravity with the new gravitometer involves manual positioning of the index arm 30 to two positions and of the index 32 to one position. Only one scale reading, that directly giving the specific gravity of the sample, is required.

The scale 40 is calibrated from the following equation:

$$(x = \frac{D(\text{s. g.} - 1)}{\text{s. g.}}$$

where $x$ is the horizontal distance along the scale measured from the vertical line designated 1.00, positive values of $x$ being to the right of such line, D is the horizontal distance between the starting line 44 and the vertical plane containing the axis of the drum and s. g. is specific gravity. Thus in a device wherein the line 44 is spaced 12 inches from the axis of the drum, a scale line corresponding to a specific gravity of 1.5 will be located 4 inches to the right of the line 1.00, whereas with a distance D of 10 inches, the line corresponding to a specific gravity of 1.50 will be located 3.33 inches to the right of line 1.00.

The derivation of the above equation for scale calibration can be briefly given as follows:

Let W$a$ be the weight of any sample in air and W$w$ be the weight of the same sample in water. Then—

(1) $$\text{s. g.} = \frac{Wa}{Wa - Ww}$$

If M is a constant related to the weight of the arm 18 and counter-weight 16, and $r$ the radius of the drum, then taking moments about the axis of the drum with a sample in clip 56, we have—

(2) $$rWa = DM$$

and taking moments with the sample immersed in water in the clip 58 we have—

(3) $$rWw = xM$$

where $x$ is the horizontal distance measured from the 1.00 line on the scale to the point of projection 36 of the index 32, when overlying the filament 24.

Equations 2 and 3 do not depend upon any specific location along the arm 8 of the center of gravity of the arm and the counter-weighted drum, as will be readily apparent from a consideration of the geometry of the device. Let R' be the radial distance along the arm 18 to the actual center of gravity, R the radial distance to the tip of the projection 36 on index 32 when overlying the intersection of the filament 24 and starting line 44, M' the effective weight of arm and drum, D' the horizontal distance of the center of gravity from the vertical plane through the axis of the drum in the starting position and $x'$ the corresponding distance when the sample is in water, then equations corresponding to Equations 2 and 3 can be written—

(4) $$rWa = D'M'$$

and (5) $$rWw = x'M'$$

but $$\frac{D'}{D} = \frac{R'}{R}$$

and $$\frac{x'}{x} = \frac{R'}{R}$$

and therefore by putting $$M = M'\left(\frac{R}{R'}\right)$$

Equations 4 and 5 transform to Equations 2 and 3 respectively.

Substituting the values of W$a$ and W$w$ from Equations 2 and 3 in the equation for specific gravity we have—

$$\text{s. g.} = \frac{\frac{DM}{r}}{\frac{DM}{r} - \frac{xM}{r}}$$

or $$\text{s. g.} = \frac{D}{D - x}$$

and this relation reduces to that previously given for calibration of the scale, namely—

$$x = \frac{D(\text{s. g.} - 1)}{\text{s. g.}}$$

Thus neither the diameter of the drum nor the weight of the drum and arm 18 enter into the relation for calibration of the scale, and any distance D between the starting line 44 and the vertical plane containing the axis of the drum may be chosen and the scale calibrated accordingly, provided, of course, that the arm 18 is longer than D and that the relative weights of the parts and of samples to be measured are such that the arm 18 will cross the starting line when the sample is supported in clip 56. The greater the distance D the wider the spacing between scale lines representing the same difference in specific gravity. Preferably, therefore, the drum and arm 18 are made as light as possible to provide a relatively large angle of rotation of the drum when measuring specific gravity of a relatively light sample, thereby permitting a relatively large value of D and greater number of legible scale divisions. For example, with a distance D of approximately 12 inches the scale may be conveniently graduated in specific gravities 0.01 point apart.

The invention has now been described with reference to one specific embodiment thereof. As the invention is concerned primarily with the broad features of the new gravitometer, and not with specific details of construction, no attempt has been made to illustrate such details in the drawing. Obviously, for a precision device, care must be taken to provide substantial frictionless rotation of the shaft 10 in the bearings 8, to insure that the drum is so mounted that its axis coincides with the axis of the shaft, that the vertical plane of the scale is perpendicular to the vertical plane containing the axis of the drum, and that the filament 24 lies in a true radial direction with respect to the drum axis.

The following is claimed:

1. A gravitometer, comprising in combination a drum mounted for rotation about a horizontal axis, an arm radially disposed with respect to the axis of the drum and movable with the drum from a neutral vertical position to an angular position when a sample the specific gravity of which is to be measured is suspended from the periphery of the drum in air and to another angular position when the suspended sample is in water, a scale positioned adjacent the path of movement of the free end of said arm and having vertical lines thereon indicative of values of specific gravity, and calibrated with respect to the horizontal distance from the vertical plane containing the axis of the drum of a vertical "starting" line position substantially in the plane of the scale for intersection by said arm when a suspended sample is in air, and operator controlled adjustable means for signifying the radial distance along said arm of the point of intersection of said arm with the "starting" line, the spacing of said scale lines being such that the specific gravity of a sample is given by the scale line intersected by said arm at such point when the sample is in water.

2. The gravitometer according to claim 1 wherein said last mentioned means comprise a manually movable index arm mounted for pivotal movement about the axis of the drum and an adjustable index pointer on said index arm adapted to be brought into registry with the intersection of said first mentioned arm with said "starting" line, the position of said index pointer, when the sample is in water and said index arm is moved into the resulting angular position of said first mentioned arm determining the desired scale line.

3. The gravitometer according to claim 1 wherein a filament is mounted on said arm near the free end thereof and is disposed radially with respect to said axis, said filament serving as a reference when intersecting the "starting" line when a sample is in air and when intersecting a scale line when a sample is in water, and wherein said locating means comprises a manually movable index arm mounted for pivotal movement about the axis of the drum and carrying an index pointer radially adjustable therealong, said index pointer being adapted to be moved into registry with the intersection of said filament with the "starting" line when a sample is in air, the position of said index pointer when registering with said filament when a sample is in water determining the desired scale line.

4. The gravitometer according to claim 1 wherein the "starting" line is at a horizontal distance D from the vertical plane containing the axis of the drum, the scale being so calibrated that the horizontal distance $x$ from the vertical plane containing the axis of the drum of a line corresponding to a specific gravity s. g. is equal to—

$$D\ (s.\ g.-1)/s.\ g.$$

positive values of $x$ lying between said vertical plane and the starting line.

5. The gravitometer according to claim 1 wherein a flexible band secured at a point intermediate its ends to the upper periphery of the drum has a sample supporting means secured to one of its ends and a weight for counterbalancing said sample supporting means secured at its other end, the weight of said band per unit length being equal to one-half the weight of water displaced per unit length of said supporting means to compensate for buoyancy of any part of the support means immersed in water.

6. In a gravitometer, an arm adapted to assume an angular position about a horizontal axis when a sample the specific gravity of which is to be measured is in air and to assume another angular position when the same sample is in water, a scale positioned adjacent the path of movement of said arm in moving from a vertical position which the arm is adapted to assume in the absence of a sample to different angular positions, said scale including vertical lines spaced horizontally from the vertical plane containing the pivotal axis of said arm and identified by numerical values of specific gravity, the value identifying any one line being related to the horizontal distance $x$ from the vertical plane containing said axis by the formula $$x = D\left(\frac{s.\ g.-1}{s.\ g.}\right)$$

where s. g. is the numerical value of specific gravity and D is the horizontal distance from said vertical plane to a fixed vertical line intersected by said arm when a sample is in air and operator controlled adjustable means for signifying the radial distance along said arm of the point of intersection of said arm with the fixed vertical line, whereby the scale line intersected by said arm at such point when the sample is in water yields the specific gravity of the sample.

7. In a gravitometer, an arm adapted to assume an angular position about a horizontal axis when a sample the specific gravity of which is to be measured is in air and to assume another angular position when the same sample is in water, a scale positioned adjacent the path of movement of said arm in moving from a vertical position which the arm is adapted to assume in the absence of a sample to different angular positions, said scale including vertical lines spaced horizontally from the vertical plane containing the pivotal axis of said arm and identified by numerical values of specific gravity, the value identifying any one line being related to the horizontal distance $x$ from the vertical plane containing said axis by the formula $$x = D\left(\frac{s.\ g.-1}{s.\ g.}\right)$$

where s. g. is the numerical value of specific gravity and D is the horizontal distance to a fixed vertical line intersected by said arm when a sample is in air, a manually movable index arm mounted for pivotal movement about said horizontal axis, and an index adjustably mounted on said arm adapted to be brought into registry with the part of said first mentioned arm that intersects said fixed vertical line when the sample is in air whereby when the sample is in water and the index arm is moved to bring the index into registry with the same part of said first arm the specific gravity of the sample may be read from the vertical line intersected by said part of the first mentioned arm.

8. In a gravitometer, a drum mounted for rotation about a horizontal axis, a weighted arm radially disposed with respect to the axis of said drum and movable with said drum from a neutral vertical position to different angular positions when a sample the specific gravity of which is to be measured is supported from the periphery of the drum in air or in water, a scale disposed in a vertical plane perpendicular to the vertical plane containing the axis of the drum and adjacent the path of movement of the free end of said arm, said scale extending horizontally from the vertical plane including the axis of the drum for a distance D less than the radial length of said arm, said scale having vertical lines thereon representing different values of specific gravity, the relation between the distance D and horizontal distance $x$ from the vertical plane containing the axis of the drum of a line indicative of a specific gravity s. g. being $$x = \frac{D(s.\ g.-1)}{s.\ g.}$$

whereby the vertical scale line intersected when the sample is in water by said arm at the point on said arm intersected by a vertical line at the horizontal distance D when the sample is in air yields the specific gravity of the sample.

9. A gravitometer comprising in combination a drum rotatably mounted about a horizontal axis, an arm secured to said drum and extending radially of the axis thereof, said drum and arm, when said arm extends vertically downward, being in stable equilibrium, an elongated laterally flexible member secured to and supported by said drum and engaging the upper periphery thereof through an arc of 180°, means carried by one end of said member for optionally supporting in air or in water a sample the specific gravity of which is to be measured, means carried by the other end of said member for counterbalancing said support means, said arm carrying near the free end thereof a filament radially disposed with respect to the axis of the drum, a scale disposed in a vertical plane perpendicular to the vertical plane including the axis of the drum and positioned adjacent the path of movement of the filament when a sample supported in said support means rotates the drum to different positions of equilibrium, depending upon whether the sample is in air or in water, said scale having vertical spaced lines thereon and indicia associated therewith representating values of specific gravity, said scale terminating with a vertical "starting" line at a horizontal distance D from the vertical plane containing the axis and positioned for intersection by the filament when a supported sample is in air, the calibration of the lines of the scale being so related to the distance D that the horizontal distance $x$ from the vertical plane containing the axis of the drum of a line representing a specific gravity s. g. is equal to $$\frac{D(\text{s. g.}-1)}{\text{s. g.}}$$

the specific gravity of a sample being that associated with the vertical line of the scale intersected, when the sample is supported in water, by the same point of the filament that intersects the starting line when the sample is supported in air.

References Cited in the file of this patent

UNITED STATES PATENTS

| | | |
|---|---|---|
| 1,072,952 | Jolly | Sept. 9, 1913 |
| 1,188,527 | Young | June 27, 1916 |
| 1,950,963 | Benton | Mar. 13, 1934 |
| 2,463,159 | Dietert | Mar. 1, 1949 |

FOREIGN PATENTS

| | | |
|---|---|---|
| 4,019 | Great Britain | Oct. 30, 1877 |